J. H. WRIGHT.
BRACKET.
APPLICATION FILED OCT. 10, 1919.
1,342,659.
Patented June 8, 1920.
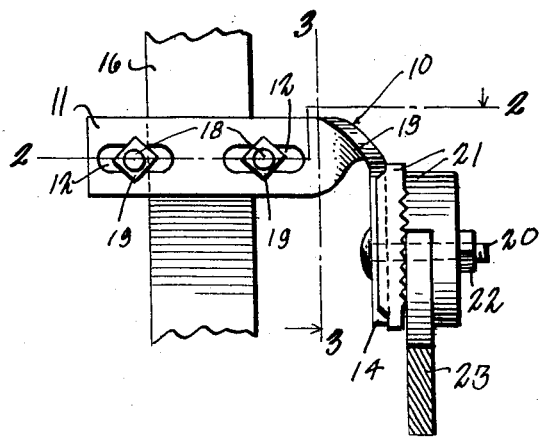
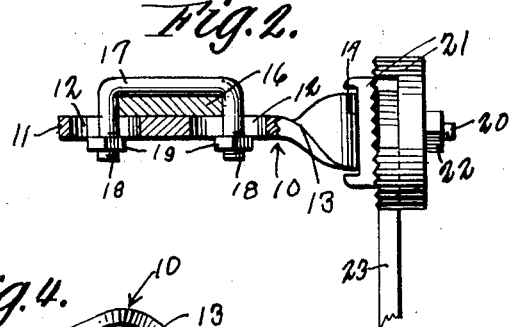
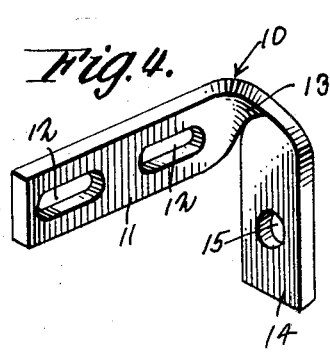
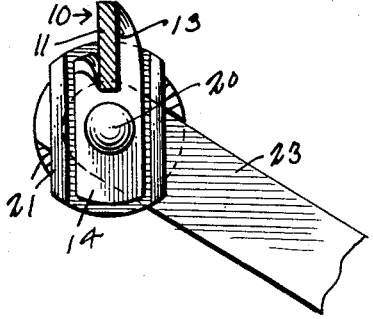
WITNESSES
Guy M. Spring
H. C. Vrooman
Inventor
JOSEPH H. WRIGHT
By Richard B. Owen
Attorney

UNITED STATES PATENT OFFICE.

JOSEPH HANSEL WRIGHT, OF HENDERSON, TEXAS.

BRACKET.

1,342,659.  Specification of Letters Patent. Patented June 8, 1920.

Application filed October 10, 1919. Serial No. 329,799.

*To all whom it may concern:*

Be it known that I, JOSEPH H. WRIGHT, a citizen of the United States, residing at Henderson, in the county of Rusk and State of Texas, have invented certain new and useful Improvements in Brackets, of which the following is a specification.

This invention relates to agricultural implements and more especially to a bracket whereby various elements may be attached to different portions of agricultural implements, such for instance as a guard fender to a cultivator tooth.

One object of this invention is the production of a bracket which is of such shape as to allow a clamping means to be connected thereto whereby the bracket may be adjusted vertically along the support to which it is connected as well as it may be adjusted sidewise as occasion may require.

Another object of this invention is the production of a bracket which is formed from a single strip of material and is bent so as to be easily connected to a support and at the same time properly support a clamp to which the implement to be connected to the cultivator or other agricultural implement is connected.

One practical form of construction and assembly of the present invention will be hereinafter described and is illustrated in the drawing, in which:

Figure 1 is an elevation of the bracket in use.

Fig. 2 is a longitudinal section taken on the line 2—2 of Fig. 1.

Fig. 3 is a vertical section taken on the line 3—3 of Fig. 1, looking in the direction of the arrow.

Fig. 4 is a detail perspective view of the bracket *per se*.

Fig. 5 is a detail perspective view of the yoke used in connection with this bracket.

In the preferred embodiment of the present invention 10 indicates in general the bracket as shown clearly in Fig. 4. This bracket is formed from a strip of material of sufficiently heavy nature to withstand the usage to which the device is applied. The body 11 of the bracket extends horizontally and is flat, being turned to extend with its edges uppermost and lowermost and with its surfaces vertically as shown clearly in the drawing. This body is provided with a pair of longitudinally extending slots 12, for purposes to be hereinafter set forth. The body is twisted at one end as shown at 13, for substantially a quarter of a revolution to terminate in the depending leg 14. This leg is therefor extended vertically, although it is turned so that the major axis of the leg extends at right angles to the major axis of the body and so that the side edges of the leg extend in vertical planes spaced to each side of the body of the bracket.

Thus the outer surface of the leg is flat to provide a bearing surface at right angles to the bearing surface of the body as is apparent for instance from an inspection of Fig. 2. The leg is provided with a central aperture 15 therein for purposes yet to appear. In applying this bracket when in use, it may be positioned upon any suitable support, such for instance as a tooth 16 of a cultivator. A U-shaped yoke 17, the construction of which is clearly illustrated in Fig. 5, is passed about the opposite side of the tooth 16 and has its threaded extensions 18 passed through the longitudinally extending slots 12 of the body 11 to receive retaining nuts 19. The nuts and yoke will therefor clamp the body 11 of the bracket in an adjusted set position upon the tooth 16. By loosening the nuts, the bracket may be moved upwardly or downwardly along the tooth or may be moved horizontally in an endwise manner so that the leg 14 may be adjusted vertically or it may be adjusted with respect to the distance with which it is carried from the side edge of the tooth 16 according to the purposes to which the device is applied. After this adjustment of the body of the bracket, the nuts may be again tightened upon the threaded ends 18 of the yoke, thus bringing the yoke and the bracket into a binding engagement with the tooth to cause the bracket to be retained in an adjusted set position upon this tooth.

A bolt 20 is inserted through the opening 15 in the leg 14 and supports thereon a frictional clamp 21, this clamp being retained in position by a nut 22 carried upon the projecting end of the bolt 20 and bearing thereon as shown in Figs. 1 and 2. An extension 23 of any suitable device, such for instance as a fender may be carried upon the bolt 20 having its upper end engaged between the sections of the clamp 21. Now it is apparent the clamp may be adjusted upon the bolt to vertically adjust the extension 23, although this extension is free to pivot upon the bolt 20, without binding action on the part of the clamp 21, the clamp 21 only limiting downward or upward swinging movement of the extension, but allowing a certain amount of this movement. The invention now disclosed relates particularly to the bracket *per se* and no novelty is claimed for the construction of the clamp and for this reason a detailed description of the construction is not deemed necessary.

It will be seen that a very simple and efficient bracket has been provided to allow various attachments to be applied to agricultural implements, particularly to cultivators. For instance, in the present device, the bracket may be adjusted upwardly or downwardly along the tooth according to the implement attached thereto or if desired to bring the implement very close to the side of the cultivator tooth, as for instance in the use of a fender, this may be accomplished by the sliding of the body along the projecting ends of the yoke when the nuts are loosened and after this adjustment the nut may be tightened to firmly hold the bracket in an adjusted condition. Furthermore, there is no chance of the bracket being injured when in use, while the extension of the body allows the same to be efficiently supported upon a piece of the cultivator or other agricultural implement while the leg depends to allow the clamp to be easily applied thereto as fully set forth.

The foregoing description and the drawing has reference to what may be considered the approved or preferred embodiment of my invention. It is to be understood however, that I may make such changes in construction and assembly of parts, materials, dimensions, etc., as may prove expedient and fall within the scope of the appended claims.

Having thus fully described my invention, what I claim as new and desire to secure by Letters Patent is:—

1. In a device of the character described, the combination of a bracket, said bracket comprising a body having its side surfaces extending vertically, said bracket having longitudinally extending slots formed therein, a yoke having threaded ends projecting through the slots and connected with a nut, thus allowing the bracket to be adjustably mounted upon a support, said bracket being twisted substantially 90° and then being bent downwardly to form a depending leg the side edges of the leg extending vertically to present a flat outer bearing surface extending at right angles to the bearing surface of said body, said leg having an opening therein, a bolt passing through said opening, and a clamp mounted upon said bolt, as and for the purposes set forth.

2. As a new article of manufacture, a bracket formed from a strip of elongated flat material and comprising a body, having its side edges upper and lowermost, and its surfaces extending vertically, thus providing a flat vertical bearing surface upon one side of said body, said body having a pair of spaced longitudinally extending alined slots therein, said body being twisted substantially 90° at one end and then being bent downwardly to form a depending leg, the side edges of said leg extending vertically to provide a flat outer bearing surface at right angles to the bearing surface of said body, and an opening formed in said leg.

In testimony whereof I affix my signature in presence of two witnesses.

JOSEPH HANSEL WRIGHT.

Witnesses:
J. L. WELCH,
EDGAR STRONG.